(12) United States Patent
Ferreri et al.

(10) Patent No.: US 10,723,133 B2
(45) Date of Patent: Jul. 28, 2020

(54) INK ESTIMATION MECHANISM

(71) Applicants: Vincent Ferreri, Frederick, CO (US);
Walter F. Kailey, Frederick, CO (US);
Nikita Gurudath, Boulder, CO (US);
Mikel Stanich, Longmont, CO (US)

(72) Inventors: Vincent Ferreri, Frederick, CO (US);
Walter F. Kailey, Frederick, CO (US);
Nikita Gurudath, Boulder, CO (US);
Mikel Stanich, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/151,482

(22) Filed: Oct. 4, 2018

(65) Prior Publication Data
US 2020/0108621 A1 Apr. 9, 2020

(51) Int. Cl.
| B41J 2/175 | (2006.01) |
| G06K 15/10 | (2006.01) |
| B41J 2/045 | (2006.01) |
| G06K 15/02 | (2006.01) |
| H04N 1/52 | (2006.01) |
| H04N 1/405 | (2006.01) |

(52) U.S. Cl.
CPC ......... *B41J 2/17566* (2013.01); *B41J 2/0456* (2013.01); *B41J 2/04561* (2013.01); *G06K 15/102* (2013.01); *G06K 15/1881* (2013.01); *H04N 1/4057* (2013.01); *H04N 1/52* (2013.01); *B41J 2002/17569* (2013.01)

(58) Field of Classification Search
CPC .. B41J 2/17566; B41J 2/0456; B41J 2/04561; B41J 2002/17569; H04N 1/4057; H04N 1/52; G06K 15/1881; G06K 15/102
See application file for complete search history.

(56) References Cited

U.S. PATENT DOCUMENTS

| 8,576,450 B2 | 11/2013 | Shepherd et al. |
| 8,734,034 B2 | 5/2014 | Morovic et al. |
| 9,096,056 B2 | 8/2015 | Zhou et al. |
| 9,132,629 B2 | 9/2015 | Ward et al. |
| 9,656,463 B1 | 5/2017 | Ernst et al. |
| 9,785,873 B2 | 10/2017 | Stanich et al. |
| 2003/0179410 A1 | 9/2003 | Velde |
| 2013/0101328 A1* | 4/2013 | Morovic ............ H04N 1/00005 400/76 |
| 2017/0259560 A1 | 9/2017 | Sreenivasan et al. |

FOREIGN PATENT DOCUMENTS

EP 0454448 A2 10/1991

* cited by examiner

*Primary Examiner* — Christopher Wait
(74) *Attorney, Agent, or Firm* — Jaffery Watson Mendonsa & Hamilton LLP

(57) ABSTRACT

A system is disclosed. The system at least one physical memory device to store ink estimation logic and one or more processors coupled with the at least one physical memory device, to execute the ink estimation logic to receive one or more gray level histograms, receive one or more halftone designs and generate estimated ink usage data for each of one or more color planes based on the gray level histograms and the halftone designs, wherein each gray level histogram corresponds to one of the one or more color planes, and each halftone design corresponds to one of the one or more color planes.

20 Claims, 8 Drawing Sheets

INK ESTIMATION MECHANISM

FIELD OF THE INVENTION

The invention relates to the field of printing systems, and in particular, to performing ink usage estimation for a printing system.

BACKGROUND

In commercial and transactional printers, it is common to estimate ink usage to determine one of the major components of the cost to print a job with an ink jet printer. Conventional ink estimation methods involve having to first perform a rasterization (or RIP) of the print job to produce a contone image, which is subsequently halftoned with the same halftone producing algorithms and settings to be employed by the targeted printer. The result is a bitmap from the halftoning operation that describes the resulting drop (or dot) size for each pixel. The bitmap encodes the different drop sizes using a unique symbol for each different drop size (e.g., level zero for no drop, one for small, two for medium and three for large).

In an actual ink jet printer this bitmap data would be the input to the drivers of ink jet printheads. Hence the data used in an actual printer is the same as the data used to estimate ink usage for a print job. Since the drop sizes for an ink jet are known, the amount of ink required to print the job for each color may be calculated as the sum of ink for each drop size, page and color.

However, the above-described ink estimation process is computationally intensive. Methods to speed up the process involve estimating the ink for a down sampled image and multiplying the result by the down sampling factor. For example, down sampling the contone image data by a factor of two in both directions results in a bitmap having one quarter of the pixels of the original. An estimate using the sum of the ink drops, based on the downsampled image must be scaled by a factor of four to obtain an estimate for the ink usage of the original contone image. Yet this process is inefficient since the down sampling factor can only be made so large (e.g., normally 2 or 4 depending on a RIP resolution) before the bitmap resolution/quality is so low/degraded that the estimate becomes too erroneous.

Accordingly, an improved mechanism to perform ink estimation is desired.

SUMMARY

In one embodiment, a method is disclosed. The method includes receiving one or more gray level histograms, wherein each gray level histogram corresponds to one of the one or more color planes, receiving one or more halftone designs, wherein each halftone design corresponds to one of the one or more color planes and generating estimated ink usage data for each of one or more color planes based on the gray level histograms and the halftone designs.

BRIEF DESCRIPTION OF THE DRAWINGS

A better understanding of the present invention can be obtained from the following detailed description in conjunction with the following drawings, in which.

DETAILED DESCRIPTION

A mechanism to perform ink estimation for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
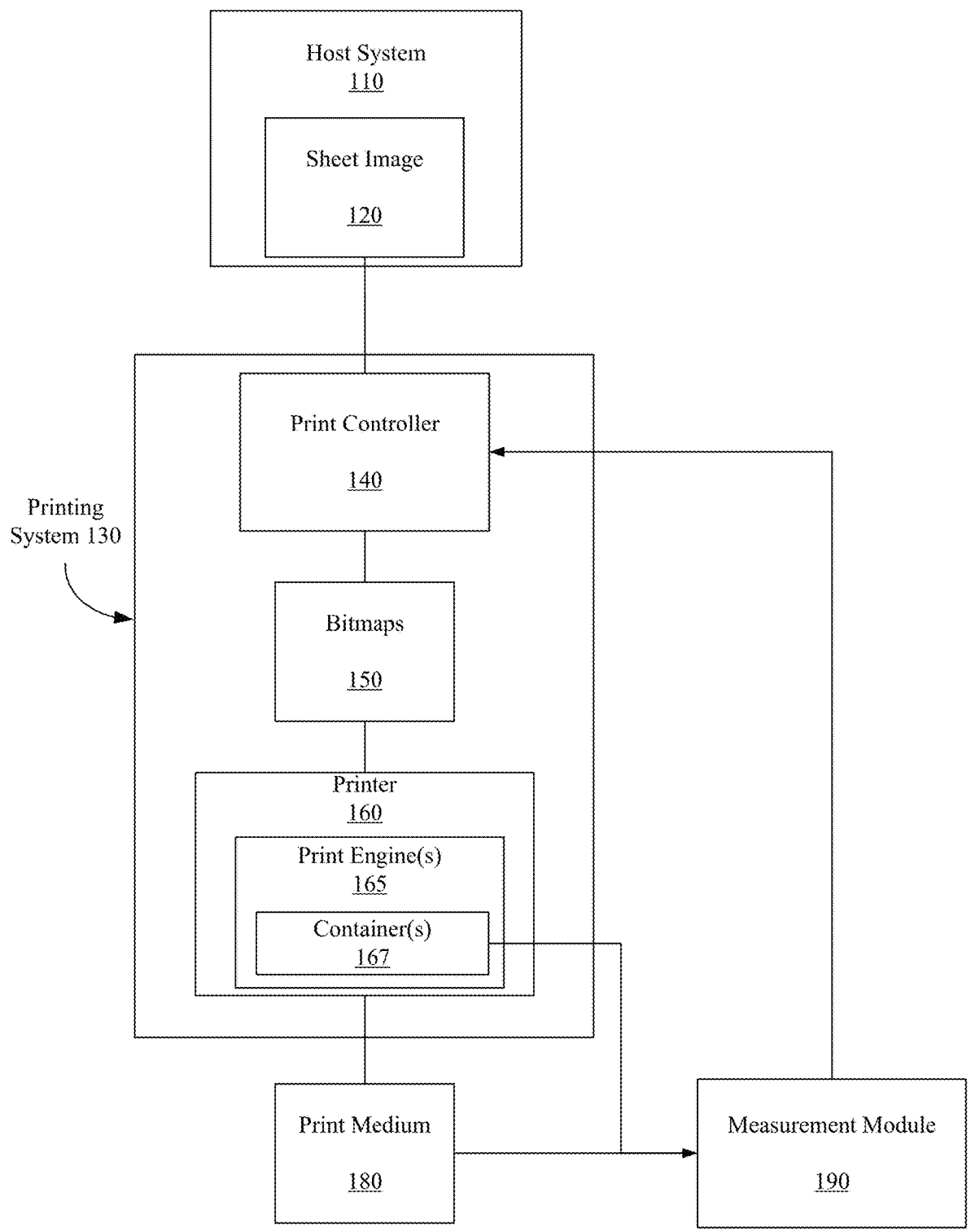
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 (e.g., via toner, ink, marking material, coatings, etc.) based on the sheet image 120. In a further embodiment, printer 160 includes containers 167 (e.g., bags, cartridges, etc.) to store the marking material to be applied to print medium 180.

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, measurement module 190 is implemented to obtain measurements of the printed medium 180. In a further embodiment, measurement module 190 is implemented to measure the weight of containers 167. The measured results are communicated to print controller 140 to be used in an ink usage estimation process. The measurement system may be a stand-alone process or be integrated into the printing system 130.

Figure 2:
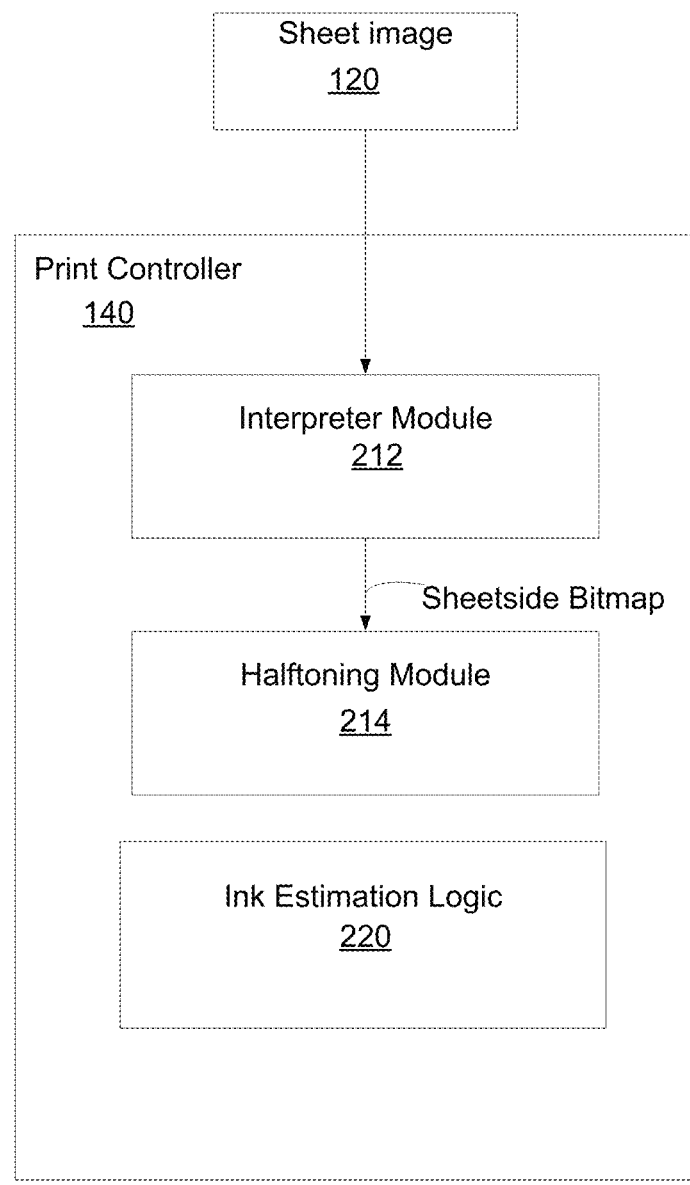
FIG. 2 is a block diagram illustrating one embodiment of a print controller.

FIG. 2 illustrate one embodiment of a print controller 140. As shown in FIG. 2, print controller 140 (e.g., DFE or digital front end), in its generalized form, includes interpreter module 212, halftoning module 214 and ink estimation logic 220. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location. In one embodiment, the halftone design may include a finite set of transition thresholds between a finite collection of successively larger drop sizes, beginning with zero and ending with a maximum drop size (e.g., threshold arrays or multibit threshold arrays). In another embodiment, the halftone design may include a three dimensional look-up table with all included gray level values. In a further embodiment, halftoning module 214 performs the multi-bit halftoning using the halftone design (e.g. multi-bit threshold arrays (MTAs)).

Multi-bit halftoning is a halftone screening operation in which the final result is a selection of a specific drop size available from an entire set of drop size that the print engine is capable of employing for printing. Drop size selection based on the value of a single pixel is referred to as "Point Operation" halftoning. This contrasts with "Neighborhood Operation" halftoning, where multiple pixels in the vicinity of the pixel being printed are used to determine the drop size. Examples of neighborhood operation halftoning include the well-known error diffusion method. The drop size selection is based on the pixel values in the sheetside bitmap.

Multi-bit halftoning is an extension of binary halftoning. Binary halftoning may use a single threshold array combined with a logical operation to decide if a drop is printed based on the contone level for a pixel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than and less than or equal to operations to determine the drop size by comparing the threshold and image contone data for each pixel. Multi-bit defines a power of two set of drop sizes (e.g., two bit halftone designs have four total drops, including a zero drop size). While power of two may be employed to define the number of drops, systems not following this such as a three total drop system may be used and are still considered multi-bit.

Figure 3:
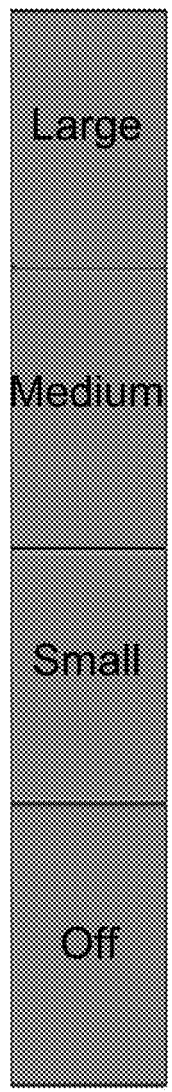
FIG. 3 illustrates one embodiment of multibit halftone designs, where the halftones are described using multi-bit threshold arrays (MTAs)

For multi-bit halftones, as shown in FIG. 3, the MTA is a three-dimensional array including one two-dimensional array for each drop size transition. Thus an MTA includes a set of two-dimensional arrays of thresholds for transition between drop sizes: MTA_array(:,:,1) plane one provides the threshold for the Large output level, while MTA_array(:,:,2) plane 2 and MTA_array(:,:,3) plane 3 provide thresholds for the Medium and Small output levels respectively for a system having three drop sizes not including zero drop size (none or Off).

To use these threshold arrays for halftoning, each multibit threshold array is tiled across contone image data provided by the sheetside bitmap, which provides a set of threshold values for each pixel in the sheetmap. The contone image data (e.g., gray level data) is logically compared to the threshold data on a pixel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined for based on the contone values.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Figure 4:
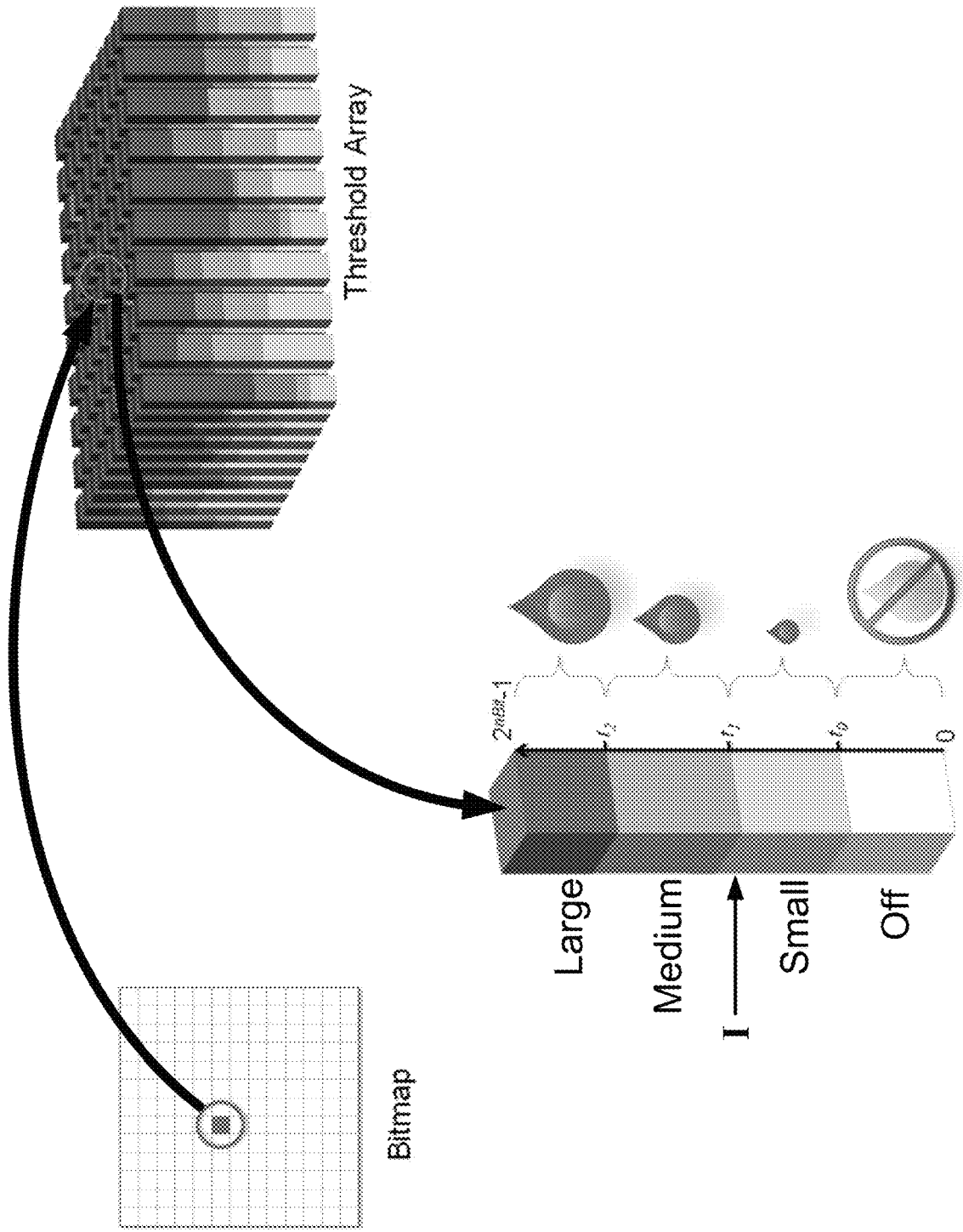
FIG. 4 illustrates another embodiment of multibit halftone designs using MTAs.

FIG. 4 illustrates another embodiment of halftoning via a MTA that consists of determining which "bin" a particular pixel is to be included, and subsequently selecting the corresponding drop size. In this embodiment, the logical comparison operations described previously are depicted by individual "totem poles" for each corresponding pixel of image data. Drop size determination is performed by finding which bin the threshold levels index. It should be appreciated from FIG. 4 that each totem pole may have different bin ranges for each different drop size.

In a further embodiment, definition of the mapping ranges for each drop size bin are defined by the threshold values $t_0$, $t_1$, $t_2$, which are specific values for that pixel location from the multibit threshold array. As shown in FIG. 4, each pixel in the bitmap selects a specific corresponding totem pole. The gray level for that pixel in the bitmap is then mapped to a particular bin, and a drop size I (e.g., $0$-$2^{nBit-1}$) is selected. The total height of the totem poles is related to the bit depth of the contone data. In an 8-bit printing system, nBit equals 8. Therefore in that case, the top of the totem pole corresponds to level 255 ($2^8-1$), which is the largest digital count value permitted for this 8-bit printing system.

Referring back to FIG. 2, ink estimation logic 220 is implemented to provide an estimation of ink that is to be used to produce a print job (or each page of the print job). In such an embodiment, ink estimation logic 220 uses histograms generated for each color plane (e.g., CMYK) and MTAs for each color plane to estimate the print job ink usage. Although shown as being implemented in print controller 140, other embodiments may feature ink estimation logic 220 being implemented in any type of computing devices, such as host system 110.

Figure 5:
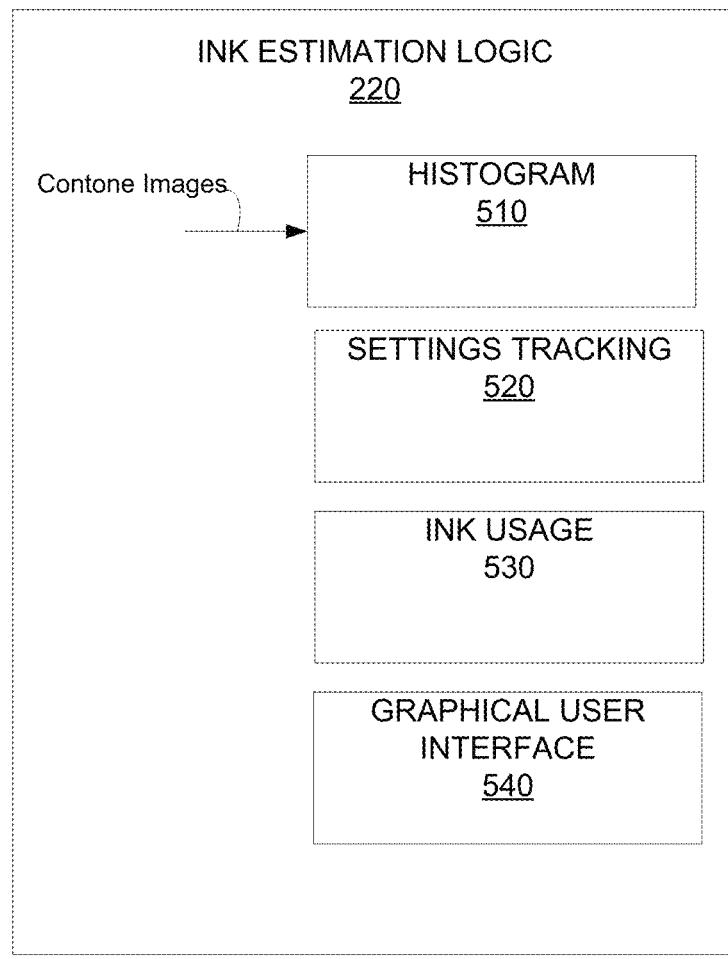
FIG. 5 illustrates one embodiment of ink estimation logic.

FIG. 5 illustrates one embodiment of an ink estimation logic 220, including histogram engine 510, settings tracking module 520, ink usage calculator 530 and graphical user interface (GUI) 540. Histogram engine 510 generates a histogram based on the contone images for each color plane implemented to print a print job without requiring that the job be RIPed using halftone data. The histogram is a distribution of the contone image data for every gray level for each color plane over the total print job, which includes all pixels.

In one embodiment, histogram engine 510 receives contone images corresponding to each color plane of a print job that is to be printed and generates a histogram for each color plane by counting the digital count value for each pixel over a total range of allowable digital count values. For a CMYK contone image, the total number of gray levels per color plane=$2^n$, where n=bit depth. Accordingly, four histograms are generated to define all possible colors for a print job in the CMYK color space.

In other embodiments, more colorants may be used (e.g., Magnetic Ink Character Recognition (MICR), Protector, etc.) and those planes may be processed/estimated likewise. In a further embodiment, histograms may show the distribution with bucket sizes having multiple gray levels in each bucket to increase performance with a small decrease in accuracy.

In other embodiments highly, efficient single pass processing of the MTAs can be employed which do not require storage of the entire MTA threshold in memory. Such methods include computing the fractional distributions of drops utilizing only the required threshold data. In addition, the distribution only needs to be computed for the number of gray levels used with the histogram data. In doing this, we can quickly read/analyze/discard portions of the MTA data to form the fractional distributions we need.

Settings tracking module 520 acquires and stores print job settings and printer system settings that are used in conjunction with the histograms and the MTAs to perform ink estimation. In one embodiment, the print job settings and printer system settings are received via a GUI 540 included for ink estimation logic 220. However other embodiments may comprise settings tracking module 520 receiving the print job settings information via a job ticket submitted with the print job and/or components of print controller 140.

In one embodiment, the system selects the halftone MTA files corresponding to the same halftone files which may be used to print the job using the same settings (e.g., print job settings and/or printer system settings). Furthermore, the histogram is generated using contone data produced by RIPing the job employing the same color management and transfer functions which are used to print the job. The impact of engine calibration transfer functions may be included in the halftone MTA files or alternately they can be included with the color management when computing the histograms.

In one embodiment, print job settings include information, such as scaling, n-up or other imposition, print quality/resolution, number copies, simplex/duplex. In a further embodiment, one or more of these print job settings may be included in a print job settings group (e.g., a job ticket). Moreover, many of the print job settings may already be accounted for in sheetmaps, such as imposition, resolution, and number of copies. In yet a further embodiment, print job settings may include information other details regarding the RIP (e.g., color management settings, job processor, etc.), which determine the specifics of the histograms.

Printer system settings may also include information for printer 160 that may determine the MTAs that are selected and/or implemented. In one embodiment, printer system settings may include print speed, print resolution, calibration, hardware settings and adjustments, uniformity, flushing type, post-processing marks, undercoat/overcoat type, ink type selection, density mode, print speed or the printer type/model, etc.

Figure 6:
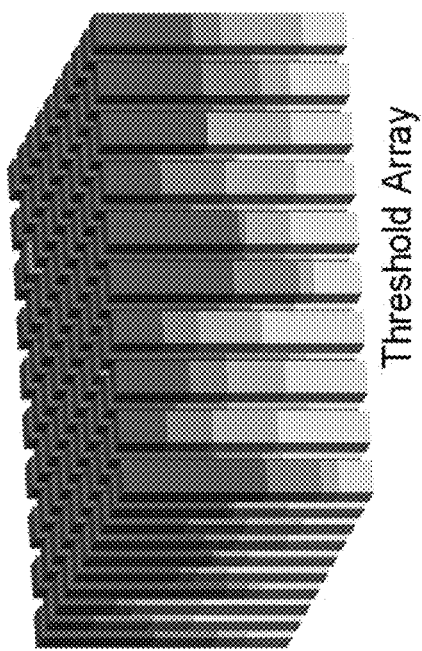
FIG. 6 illustrates one embodiment of a graph showing a distribution of drop volumes for each gray level.
Figure 6:
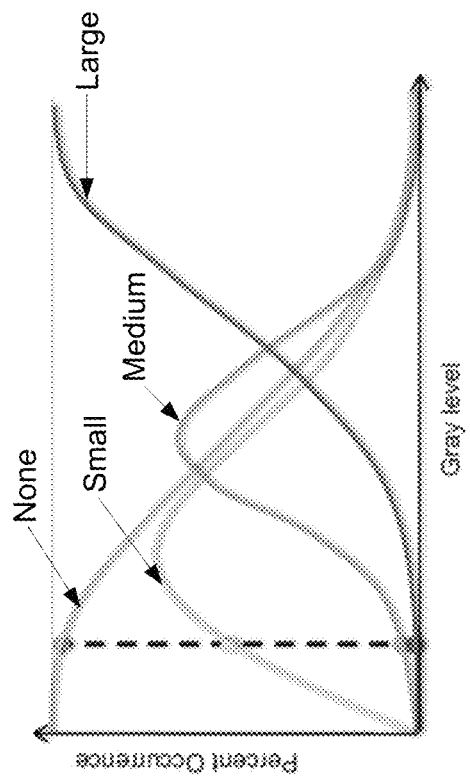

Ink usage calculator 530 determines an estimated ink usage based on the color histograms and MTAs. As discussed above, the color histograms and MTAs may be selected based on the print job settings and/or print system settings. According to one embodiment, ink usage calculator 530 analyzes the MTA to determine a fractional distribution of drop volumes that will be encountered for each gray-level. In such an embodiment, a percentage of Small, Medium, and Large drops are determined for each gray level. Employing this same approach with a binary (single drop size) halftone is a case that is also covered by these equations and methods. FIG. 6 illustrates one embodiment of a graph showing a distribution of percent drop occurrence rates for each gray level for a multi-bit threshold array for each of 4 drop sizes (including none drop).

Upon determining the distribution of percent drop occurrence rates for each size drop, ink usage calculator 530 combines this with the histograms to determine the estimated number of expected Small, Medium, and Large drops for the entire print job. In one embodiment, the determination is made via matrix multiplication, such that:

$$n = R \cdot h, \text{ where}$$

n=Estimated Drop Counts $[n_{Drop} \times 1]$ vector, R=Occurrence Rate $[n_{Drop} \times n_{GrayLevel}]$ matrix, and h=Histogram $[n_{GrayLevel} \times 1]$ vector.

Since the percent drop occurrence rates represent a fraction, values from zero to one are used when computing the number of drops using these equations. Based on the above, an ink estimate total volume may be determined by multiplying and summing the expected total drop counts with their respective drop volumes (e.g., the vector dot product of drop counts with drop volumes), such that:

$$v = d \cdot n$$
$$= d \cdot (R \cdot h),$$

where v=Estimated Volume scalar, d=Drop Volumes [1×n$_{Drop}$] vector. According to one embodiment, drop volumes may be determined at ink usage calculator 330 by a generating a regression model between ink monitor data (e.g., drop counts determined by actually printing the job), and a physical weighing of the marking material in containers 167 (e.g., ink in ink bags or reservoirs) received from measurement module 190. In such an embodiment, ink calculator 330 may receive periodic measurements from measurement module 190. Ink monitor systems counting actual drops can be compared to the values from the described ink estimator which provides estimated drop counts. This allows direct comparison of the counts from the two methods which should be nearly identical for a given job being printed/estimated.

In such a system, refined estimates for drop sizes may be obtained over time based on large volume printing, drop counts and measurements. These refined drop size estimates can then be employed dynamically with the ink estimates to be adaptive to the print system or fixed values may be used after sufficient training has occurred to obtain stable drop size values. Fixed values assure that customers obtain the same estimates for all printing systems which are representative of an average system.

For instance, measurement module 190 may weigh containers 167 before and after printing a job to determine an actual quantity of ink that has been consumed by print engines 165. In another embodiment, ink calculator 330 may receive dynamic (or continuous) measurements from measurement module 190. In such an embodiment, ink calculator 330 may perform Kalman filtering (or other tracking algorithms) to determine the most recent ink usage.

Figure 7:
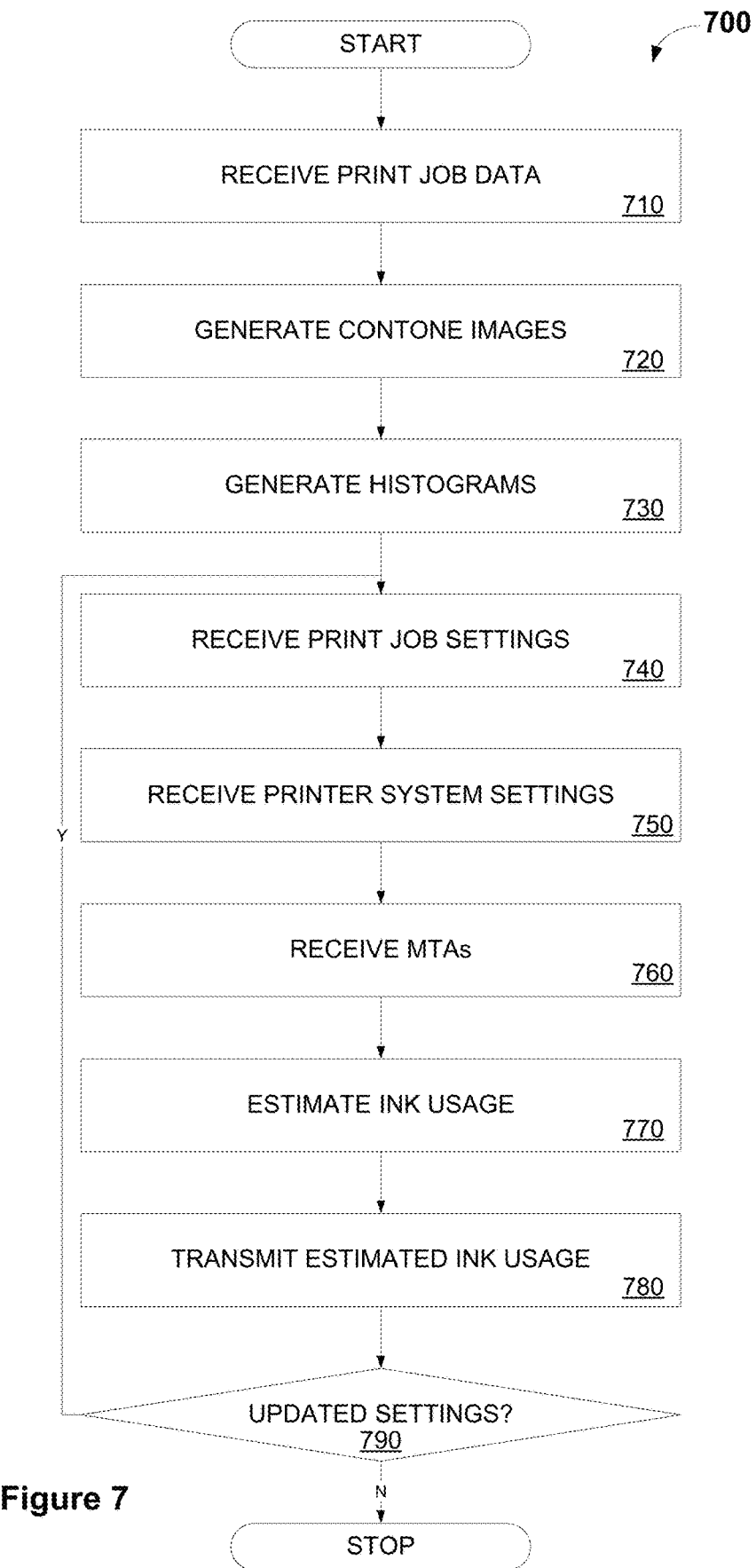
FIG. 7 is a flow diagram illustrating one embodiment for performing an ink estimation process.

FIG. 7 is a flow diagram illustrating one embodiment of a process 700 for performing ink estimation. Process 700 may be performed by processing logic that may comprise hardware (e.g., circuitry, dedicated logic, programmable logic, etc.), software (such as instructions run on a processing device), or a combination thereof. In one embodiment, process 700 may be performed by ink estimation logic 220. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710, where print job data may be received. In one embodiment, a job ticket (e.g., Job Definition Format (JDF)) may also be received with the print job data. At processing block 720, contone images are received or generated based on the print job, and job ticket if included. At processing block 730, histograms are received or generated for each color plane based on the contone images.

At processing block 740, print job settings are received. At processing block 750, the printer system settings may be received. As discussed above, the print job settings and printer system settings may be received via GUI 540, from host system 110 or any combination of the GUI 540 and host system 110. At processing block 760, the MTAs may be received or selected. In one embodiment, an MTA is received for each color plane to account for different ink characteristics of each color and to avoid dot on dot placement of different colors. At this point processing of the MTA occurs to determine the percent drop occurrence distributions for each drop size for each color plane.

At processing block 770, the estimated volume of ink usage for each color plane is determined, as discussed above, based on the histograms and the MTAs. At processing block 780, the estimated ink usage data is transmitted (e.g., reported). In one embodiment, estimated ink usage is displayed via GUI 540. However in other embodiments, print controller 140 may transmit estimated ink usage data to an external computing device. At decision block 790, a determination is made as to whether one or more of the print job settings, and/or printer system settings have been changed or updated. If so, control is returned for execution of processing blocks 740-480. Otherwise, the process has completed.

Multiple estimates may efficiently be obtained for different printer settings without regenerating the histogram data for cases where the halftone or other options are changed. Such a system allows one to determine different estimates for various "what if" options, related to printer settings (e.g., print resolutions, coating types, flushing options, etc.).

Figure 8:
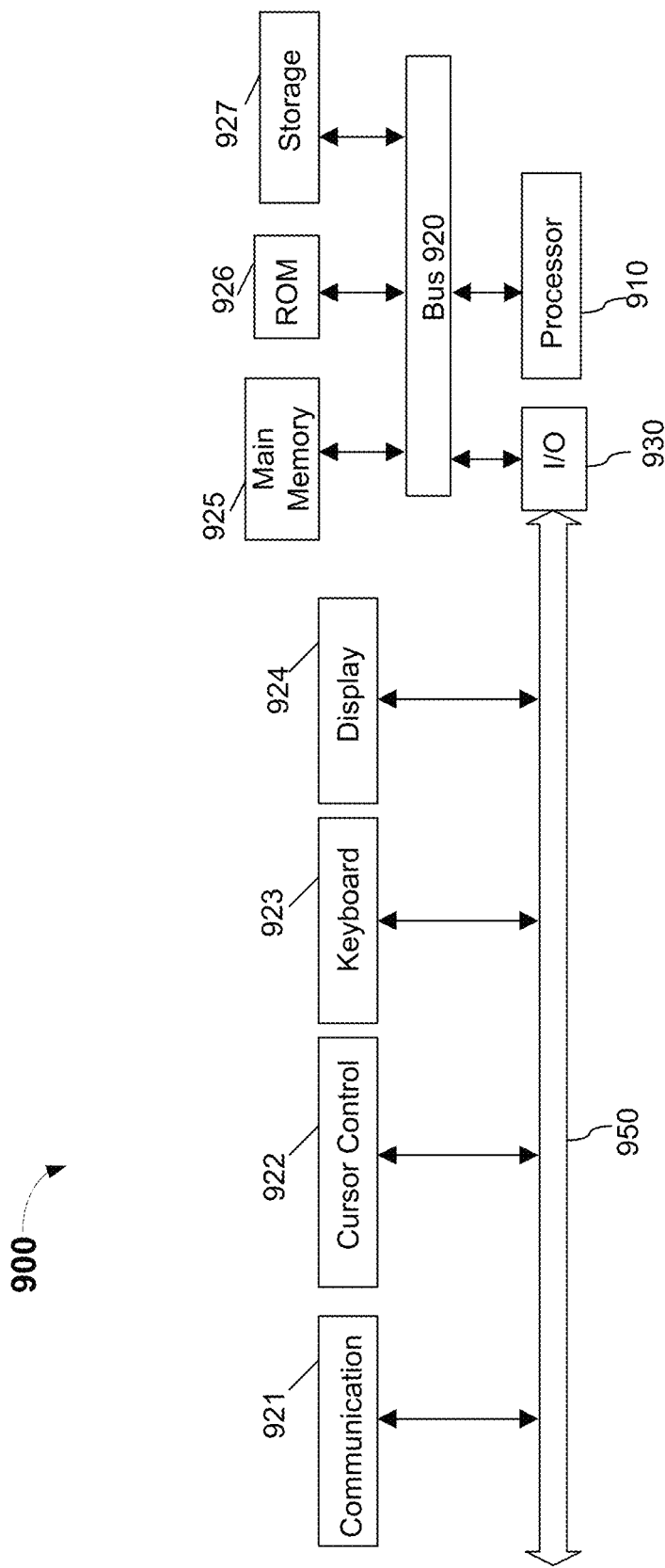
FIG. 8 illustrates one embodiment of a computer system.

FIG. 8 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
    at least one physical memory device to store ink estimation logic; and
    one or more processors coupled with the at least one physical memory device to execute the ink estimation logic to receive one or more gray level histograms, receive one or more multi-bit halftone designs and generate estimated ink usage data for each of one or more color planes based on the gray level histograms and the multi-bit halftone designs, wherein each gray level histogram corresponds to one of the one or more color planes, and each multi-bit halftone design corresponds to a selection of a drop size from a plurality of non-zero drop sizes at each of a plurality of pixel locations for each of the one or more color planes.

2. The system of claim 1, wherein generating the estimated ink usage data comprises determining a distribution of drop occurrence rates for each of the non-zero drop sizes for each of the one of the one or more color planes.

3. The system of claim 2, wherein generating the estimated ink usage data comprises determining an estimated ink drop count for each of the color planes based on the distribution of drop occurrence rates, determining ink drop volumes for each of the color planes and determining the estimated ink usage data for each of the color planes based on the estimated ink drop count and the ink drop volumes.

4. The system of claim 3, wherein determining the estimated ink drop count for each of the color planes comprises determining an estimated quantity of ink drops based on the distribution of drop occurrence rates and the gray level histograms.

5. The system of claim 3, further comprising a measurement module to receive measurement data including the ink drop volumes.

6. The system of claim 3, wherein the ink estimation logic receives one or more printer system settings implemented to select the multi-bit halftone designs.

7. The system of claim 1, further comprising a printer.

8. At least one non-transitory computer readable medium having instructions stored thereon, which when executed by one or more processors, cause the processors to:
    receive one or more gray level histograms, wherein each gray level histogram corresponds to one of the one or more color planes;
    receive one or more multi-bit halftone designs, wherein each multi-bit halftone design corresponds to a selection of a drop size from a plurality of non-zero drop sizes at each of a plurality of pixel locations for each of the one or more color planes; and
    generate estimated ink usage data for each of one or more color planes based on the gray level histograms and the multi-bit halftone designs.

9. The computer readable medium of claim 8, wherein generating the estimated ink usage data comprises:
    determining an estimated ink drop count for each of the color planes; and
    determining ink drop volumes for each of the color planes; and
    determining the estimated ink usage data for each of the color planes based on the estimated ink drop count and the ink drop volumes.

10. The computer readable medium of claim 9, wherein determining the estimated ink drop count for each of the color planes comprises:
    determining an occurrence rate for each of a plurality of ink drop sizes; and
    determining an estimated quantity of ink drops based on the occurrence rate and the gray level histograms.

11. The computer readable medium of claim 9, having instructions stored thereon, which when executed by the one or more processors, further cause the processors to receive measurement data including the ink drop volumes.

12. The computer readable medium of claim 9, having instructions stored thereon, which when executed by the one or more processors, further causes the processors to receive one or more printer system settings implemented to select the multi-bit halftone designs.

13. The computer readable medium of claim 9, having instructions stored thereon, which when executed by the one or more processors, further cause the processors to receive one or more print job settings implemented to select the multi-bit halftone designs.

14. The computer readable medium of claim 13, having instructions stored thereon, which when executed by the one or more processors, further cause the processors to:
    receive print job data; and
    rasterize the print job data based on the one or more print job settings to generate the one or more of gray level histograms.

15. A method comprising:
    receiving one or more gray level histograms, wherein each gray level histogram corresponds to one of the one or more color planes;
    receiving one or more multi-bit halftone designs, wherein each multi-bit halftone design corresponds to a selection of a drop size from a plurality of non-zero drop sizes at each of a plurality of pixel locations for each of the one or more color planes; and
    generating estimated ink usage data for each of one or more color planes based on the gray level histograms and the multi-bit halftone designs.

16. The method of claim 15, wherein generating the estimated ink usage data comprises:
    determining an estimated ink drop count for each of the color planes; and
    determining ink drop volumes for each of the color planes; and
    determining the estimated ink usage data for each of the color planes based on the estimated ink drop count and the ink drop volumes.

17. The method of claim 16, wherein determining the estimated ink drop count for each of the color planes comprises:
- determining an occurrence rate for each of a plurality of ink drop sizes; and
- determining an estimated quantity of ink drops based on the occurrence rate and the gray level histograms.

18. The method of claim 16, further comprising receiving measurement data including the ink drop volumes.

19. The method of claim 16, further comprising receiving one or more printer system settings implemented to select the multi-bit halftone designs.

20. The method of claim 16, further comprising receiving one or more print job settings implemented to select the multi-bit halftone designs.

* * * * *